Jan. 8, 1952　　　　G. M. ERNST　　　　2,582,021
VISE-OPERATED ROD CUTTER
Filed Jan. 20, 1950
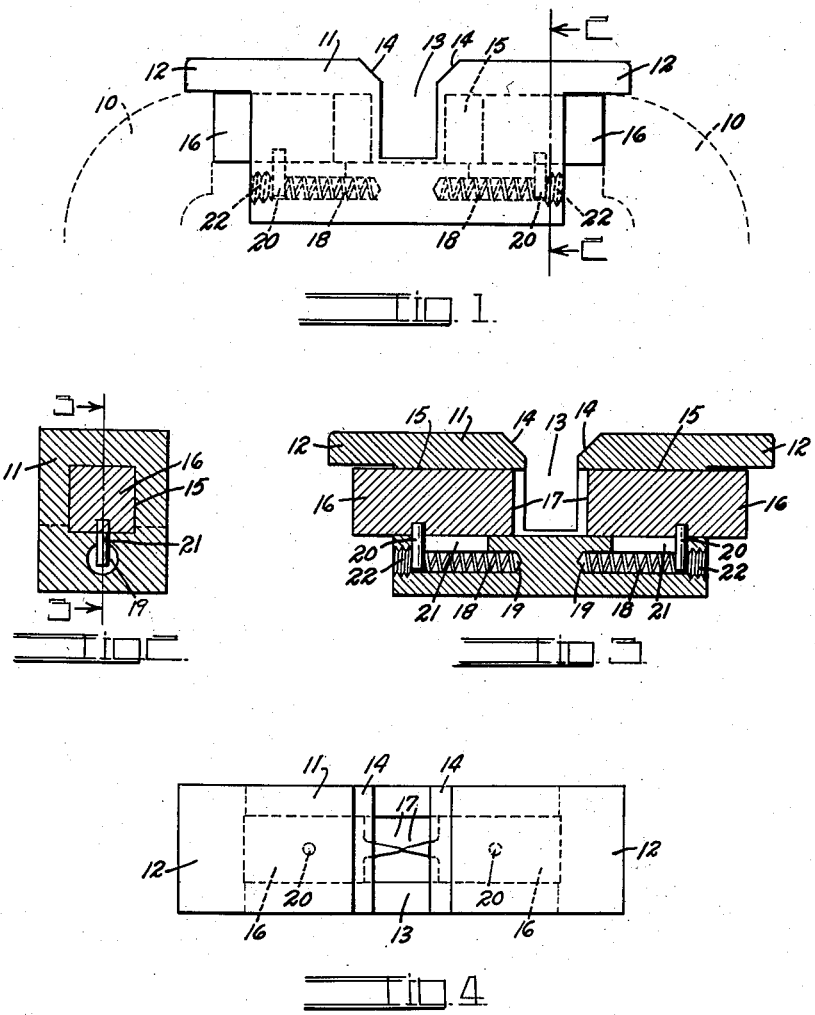
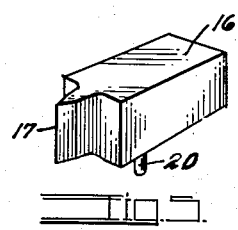
INVENTOR.
GEORGE M. ERNST
BY
ATTORNEY Patented Jan. 8, 1952

2,582,021

UNITED STATES PATENT OFFICE 2,582,021

VISE-OPERATED ROD CUTTER

George M. Ernst, Compton, Calif.

Application January 20, 1950, Serial No. 139,742

3 Claims. (Cl. 81—38)

This invention relates to a device for cutting metallic bolts and rods, and is designed as an improvement over the vise cutter illustrated in applicant's Patent No. 2,288,998. The principal object of the present invention lies in the provision of a simple, compact, and highly efficient device which can be placed in and operated by the jaws of a machinist's vise for rapidly and efficiently accomplishing the above purpose.

Another object of the invention is to provide a vise-operated bolt cutter having cutting or shearing blades which will be rigidly and accurately maintained in alignment during the cutting operation and which will maintain the rod or bolt being cut in rigid position.

Other objects and advantages reside in the details of construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a side view of the improved vise-operated cutter, illustrating its relation to the jaws of a conventional vise when ready for a cutting operation;

Fig. 2 is a cross-section therethrough, taken on the line 2—2, Fig. 1;

Fig. 3 is a longitudinal section thereof, taken on the line 3—3, Fig. 1;

Fig. 4 is a plan view of the improved cutting tool; and

Fig. 5 is a detail perspective view of a cutting blade member employed in the improved cutter.

In the drawing the jaws of a conventional vise have been indicated in broken line at 10. The improved cutter is designed to rest upon and between the jaws 10.

The cutter comprises an elongated metallic block 11 having a projecting flange 12 at each extremity. The flanges 12 are designed to rest upon the vise jaws 10, allowing the major portion of the block 11 to depend between the jaws.

A work-receiving notch 13 extends transversely of the middle of the block 11 and downwardly from the upper surface thereof. The side walls of the notch 13 are inclined outwardly at the top, as shown at 14, to facilitate the placing of a bolt or rod in the notch 13 so that the bolt or rod will extend laterally of the block 11.

A square guide passage 15 is broached or otherwise formed so as to extend longitudinally of the block 11 below the flanges 12 and across the notch 13.

A square knife member 16 is slidably inserted in each extremity of the guide passage 15. Each knife member is formed with a forwardly projecting, vertical knife edge 17 at its inner extremity. When the two members 16 are forced inwardly into the notch 13, the two knife edges 17 will align vertically with each other at the axis of the notch 13.

The total length of the knife members 16 is such that when the two edges are in contact with each other, the outer extremities of the members will be flush with the extremities of the block 11.

The knife members 16 are constantly urged outwardly in the block 11 by means of compression springs 18 positioned in spring bores 19 extending inwardly from each extremity of the block 11 immediately below each of the knife members 16. The springs are compressed between the ends of the bores 19 and spring pins 20 extending downwardly from the knife members 16.

The spring pins 20 travel in pin slots 21 extending between the broached holes 15 and the spring bores 19. The spring bores are closed by means of plugs 22 which are threaded into their entrances. The plugs 22 limit the outward movement of the pins 20 and the knife members 16.

In use, the block 11 is placed between the vise jaws 10 so that the jaws will be positioned opposite the extremities of the block 11 and below the flanges 12. The vise jaws are opened to allow the knife members 16 to project outwardly from the extremities of the block 11 sufficiently far to completely open the notch 13. The bolt or rod to be cut is then laid in the notch 13 and the vise is actuated to close the jaws so as to force the two knife blades 17 toward each other and into the material of the bolt or rod so as to sever the latter at the desired point.

The square guide passage 15 extends slightly below the bottom of the work-receiving notch 13 and the vertical width of the two knife edges 17 exceeds the width of the work-receiving notch 13. Thus, it can be seen that the knife edges will extend both above and below any bolt or rod which can be placed in the notch so as to make a clean cut throughout the entire diameter of the work.

It is desired to call attention to the fact that the outer ends of the knife members 16 are perfectly flat and are positioned accurately at right angles to the longitudinal axis of the members 16. This relieves all sideward or tilting strains or stresses on the knife members and the block 11, since these flat ends rest flat against the vise jaws 10 and move inward at right angles to the jaws without any tendency to tilt.

While a specific form of the improvement has been described and illustrated herein, it is to be understood that the same may be varied, within the scope of the appended claims, without departing from the spirit of the invention.

Having thus described the invention, what is claimed and desired secured by Letters Patent is:

1. A vise-actuated cutter comprising: an elongated block supportable between the jaws of a vise; outwardly extending flange members on the extremities of said block for resting on said jaws to support said block therebetween; a transversely extending rod-receiving notch formed in said block intermediate its extremities; a guide passage formed longitudinally of said block so as to intersect said notch; and a knife member slidably mounted in said guide passage at each side of said notch to move transversely of the latter so as to contact each other within said notch, said knife members being sufficiently long to project from the extremities of said block into contact with the jaws of said vise.

2. A vise-actuated cutter comprising: an elongated block supportable between the jaws of a vise; outwardly extending flange members on the extremities of said block for resting on said jaws to support said block therebetween; a transversely extending rod-receiving notch formed in said block intermediate its extremities; a guide passage formed longitudinally of said block so as to intersect said notch; a knife member slidably mounted in said guide passage at each side of said notch to move transversely of the latter so as to contact each other within said notch, said knife members being sufficiently long to project from the extremities of said block into contact with the jaws of said vise; and spring means interposed between each knife member and said block, said spring means acting to constantly urge said knife members away from each other.

3. A vise-actuated cutter comprising: an elongated block supportable between the jaws of a vise; outwardly extending flange members on the extremities of said block for resting on said jaws to support said block therebetween, there being a rod-receiving notch extending downwardly in and laterally of said block at substantially the middle of the latter and there being a non-circular passage extending lengthwise of said block and across said notch; a non-circular knife member slidably extending into each extremity of said passage; a knife edge formed on the inner extremity of each knife member, said knife edges adapted to align with and approach each other within the confines of said notch; a spring bore extending into each extremity of said block alongside and parallel to the non-circular passage therein; an elongated slot in the side of and extending lengthwise of each of said spring bores and communicating between that bore and the adjacent non-circular passage; a spring pin projecting from each knife member, through one of said slots, and into the adjacent bore; and a spring positioned in each bore so as to act against the pin therein to urge the adjacent knife member outward into engagement with one of said vise jaws.

GEORGE M. ERNST.

REFERENCES CITED

The following references are of record in the file of this patent:

UNITED STATES PATENTS

| Number | Name | Date |
| --- | --- | --- |
| 66,986 | Newlan | July 23, 1867 |
| 303,647 | King | Aug. 19, 1884 |
| 962,483 | Whisler | June 28, 1910 |
| 1,668,942 | Cady | May 8, 1928 |

FOREIGN PATENTS

| Number | Country | Date |
| --- | --- | --- |
| 222,504 | Great Britain | Sept. 27, 1924 |